J. W. BOOKER.
Wheel-Cultivator.

No. 38,651. Patented May 26, 1863.

UNITED STATES PATENT OFFICE.

J. W. BOOKER, OF FAIRMOUNT, ILLINOIS.

IMPROVEMENT IN CULTIVATORS.

Specification forming part of Letters Patent No. 38,651, dated May 26, 1863.

*To all whom it may concern:*

Be it known that I, J. W. BOOKER, of Fairmount, in the county of Vermillion and State of Illinois, have invented a new and Improved Cultivator; and I do hereby declare that the following is a full, clear, and exact description of the same, reference being had to the accompanying drawings, making a part of this specification, in which—

Figure 1:
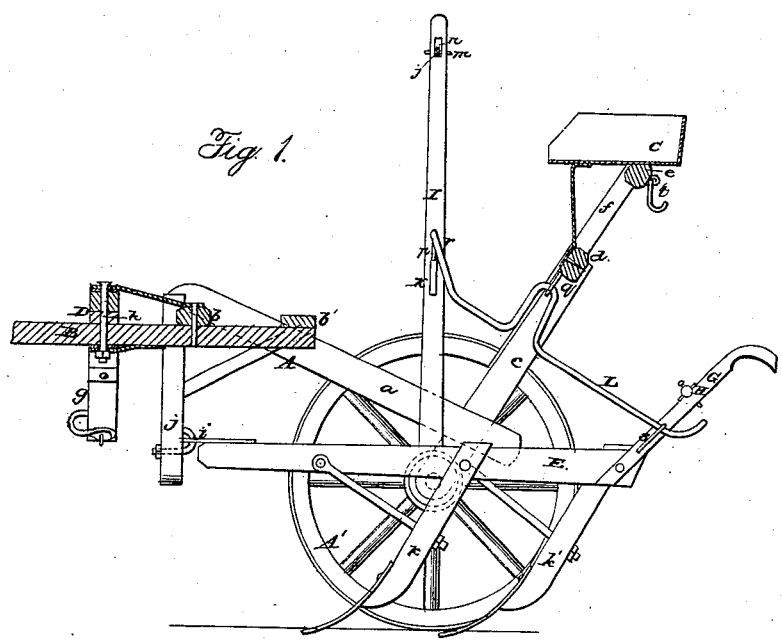
Figure 2:
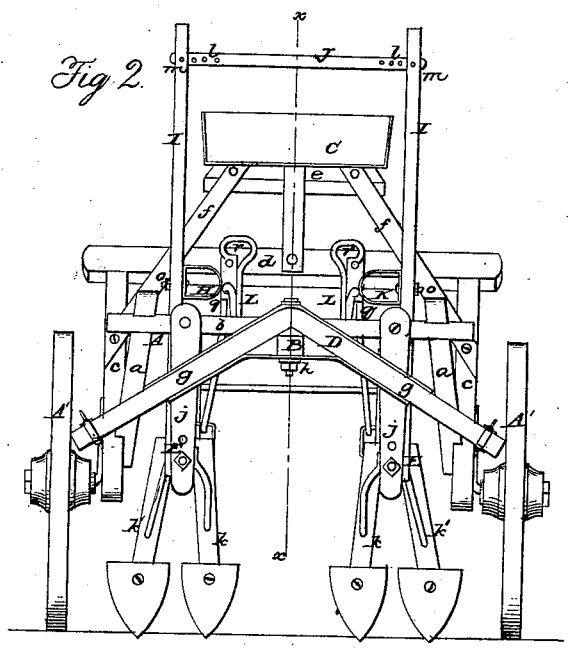

Figure 1 is a side sectional view of my invention, taken in the line $x\ x$, Fig. 2; Fig. 2, a front elevation of the same.

Similar letters of reference indicate corresponding parts in the two figures.

This invention relates to a new and improved cultivator for cultivating those crops which are grown in hills or drills—such as corn, potatoes, and the like.

To enable those skilled in the art to fully understand and construct my invention, I will proceed to describe it.

A represents what may be termed the "main frame" of the machine, which is composed of two inclined bars, $a\ a$, the front parts of which are connected by two cross-bars, $b\ b'$, to the centers of which the draft-pole B is secured at right angles. Near the back end of each inclined bar $a$ there is attached an inclined bar, $c$, the upper ends of which are connected by a cross-bar, $d$; and C is the driver's seat, which is secured to a cross-bar, $e$, on the upper ends of two inclined bars, $f f$, the latter being secured to the inclined bars $c\ c$ and the cross-bar $d$ thereof. To the lower end of the inclined bars $c\ c$ the axles of the wheels A' are attached.

D represents a double-inclined double-tree, which is shown clearly in Fig. 2. This double-tree is formed of two inclined bars, $g\ g$, which are attached at their juncture with each other to the draft-pole B by means of a bolt, $h$. These inclined bars $g\ g$ extend down at each side of the draft-pole sufficiently far to bring the draft attachment within a proper distance from the ground, and at the same time admit of the draft-pole and frame of the machine being sufficiently high to avoid coming in contact with the growing plants, so that the latter may not be injured or broken down thereby. The whiffle-trees, it will be understood, are attached to the lower ends of the inclined bars $g\ g$ of the double-tree.

E E represent two plow-beams, the front ends of which are attached by swivel or universal joints $i\ i$ to the lower ends of pendants $j\ j$, which are attached to the front cross-bar, $b$, of the inclined bars $a\ a$ of the frame A.

To each beam E there are attached two inclined bars, $k\ k'$, having each a shovel-share or plow, F, secured to their lower ends. The front bars, $k$, are secured to the inner, and the bars $k'$ to the outer, sides of said beams, so that the front plows will be nearer together than the back ones.

To the back end of each plow-beam there is attached a handle, G, and these handles are connected near their upper ends by a cross-rod, H.

To each plow-beam there is also attached an upright, I. These uprights extend upward above the driver's seat C, and they are connected near their upper ends by a cross-bar, J, which is perforated near its ends with a number of holes, $l$, through any of which and the uprights I I pins $m$ pass, the bar J being fitted loosely in mortises $n$ in the uprights I I. The rod H may be attached to the handles G G in a similar manner, in order to admit of the adjusting of the plow-beams E E nearer together or farther apart, as may be desired.

To each upright I there is attached a metal stirrup, K. These stirrups may be formed of a bar bent in the shape of a bow, so as to receive the feet of the driver on seat C. The stirrups are attached to the uprights I I by means of screw-bolts $o\ o$, which pass through vertical oblong slots $p$ in the uprights and admit of the stirrups being raised or lowered to suit the driver.

L L represent two curved metal rods, which are fitted in bearings $q\ q$, attached to the cross-bar $d$ of the inclined bars $c\ c$. The shape of these rods L is shown clearly in Fig. 1, and they are bent at their front ends to form loops $r\ r$ to receive the driver's feet, when necessary. The back parts of these bars L pass through staples $s\ s$ at the inner sides of the handles, as shown in Fig. 1.

From the above description it will be seen that as the machine is drawn along the driver from his seat C may move either or both plow-beams E E laterally by means of his feet, the latter being placed in the stirrups K K. The guiding may also be assisted by one or both hands grasping the cross-bar. This movement or adjustment of the plows is for the purpose of enabling the latter to operate at proper distances from the rows of plants, however sinuous or crooked they may be. Either or both plow-beams may be elevated, so that their plows will be free from the surface of the ground, by depressing or forcing down the front ends of the rods L L. This adjustment or movement of the plow is necessary in turning at the ends of rows.

In walking the driver grasps the handles G G, and moves them laterally in order to make the plows conform to the sinuosities of the rows of plants, and the plows are elevated by simply raising the handles. In moving or transporting the device from place to place the staples *s s* are fitted on hooks *t t*, attached to the cross bar *e* of the inclined bars *f f*.

The device, it will be seen, is extremely simple and efficient, and may be operated, while the driver is either riding or walking, with the greatest facility.

Having thus described my invention, what I claim as new, and desire to secure by Letters Patent, is—

The plow-beams E E, connected to the main frame A, as shown, in combination with the uprights I I, provided with the stirrups K K, the handles G G, attached to the plow-beams, and the curved rods L L, all arranged for joint operation, as and for the purpose herein set forth.

J. W. BOOKER.

Witnesses:
J. V. McCAGG,
JOHN ALLEN.